US 8,358,758 B2

(12) United States Patent
Serrano et al.

(10) Patent No.: US 8,358,758 B2
(45) Date of Patent: *Jan. 22, 2013

(54) FAMILIARIZATION AUGMENTATION SYSTEM AND TECHNOLOGY (FAST) DIALER

(76) Inventors: Miguel Serrano, San Juan, PR (US); Luis Figarella, Nashua, NH (US)

( * ) Notice: Subject to any disclaimer, the term of this patent is extended or adjusted under 35 U.S.C. 154(b) by 912 days.

This patent is subject to a terminal disclaimer.

(21) Appl. No.: 12/408,748

(22) Filed: Mar. 23, 2009

(65) Prior Publication Data
US 2010/0239080 A1    Sep. 23, 2010

(51) Int. Cl.
H04M 1/56      (2006.01)
H04M 15/06    (2006.01)
H04M 7/00      (2006.01)

(52) U.S. Cl. .......... 379/142.07; 379/142.01; 379/221.02

(58) Field of Classification Search ............. 379/142.01, 379/142.07, 201.1, 207.12, 211.04, 220.01, 379/221.02
See application file for complete search history.

(56) References Cited

U.S. PATENT DOCUMENTS

| 6,154,660 | A * | 11/2000 | Singh ............................ 455/564 |
| 8,254,550 | B1* | 8/2012 | Serrano ......................... 379/219 |
| 2002/0122546 | A1* | 9/2002 | Brogne et al. ........... 379/221.01 |
| 2004/0218748 | A1* | 11/2004 | Fisher ...................... 379/221.01 |
| 2007/0003035 | A1* | 1/2007 | Zhu et al. .................. 379/114.02 |

* cited by examiner

Primary Examiner — Quoc D Tran
(74) Attorney, Agent, or Firm — Luis Figarella

(57) ABSTRACT

The present invention relates to the field of telecommunications. More particularly, to an apparatus that would allow callers to time-share telephone, telecommunication or communication lines in order to truthfully vary the telephone line from which they are calling parties through the Public Switch Telephone Network (PSTN). The system would allow customers to manage the identity of their calls in ways that would maximize the probability that a called party would answer.

2 Claims, 4 Drawing Sheets

FAMILIARIZATION AUGMENTATION SYSTEM AND TECHNOLOGY (FAST) DIALER

FIELD OF THE INVENTION

The present invention relates to the field of telecommunications. More particularly, to a system and apparatus that would allow callers to manage outgoing call routing and its identification.

DESCRIPTION OF THE RELATED ART

Telephony Caller ID (CID) or calling number identification (CNID) services provide the option for its subscribers or "called parties" to identify the number where a call is originating from, and selectively decide which calls to accept. Initially introduced as an option, this service has become widespread. In fact, initially intended for in-country application, it is not uncommon to receive mobile telephony calls from overseas that identify the caller's telephone number. There is no doubt that CID services offer called parties a practical way to manage their incoming calls and the time devoted to such calls more efficiently.

On the other hand, the CID feature enables called parties to intentionally, among others, avoid important calls from parties with whom they have a contractual relation or obligations, such as banks, finance institutions, insurance companies, utilities providers, tele-marketers, and other lenders. These institutions may have the need to inform customers about the status of their financial relationship, sometimes a difficult, yet necessary, conversation. Many of these called parties opt to not answer a call from such an institution, in many cases worsening the situation which made them avoid the call in the first place.

This situation has directly impacted the efficiency and effectiveness of these types of businesses in their effort to contact their customers. Many of these businesses resort to various tactics to enhance the pick-up rate of the calls they place to customers. They may restrict the CID function or opt to subscribe the lines under different names in hope that the called party decides to take the call. This tactic works initially, but in the long run called parties recognize the tactic and originating numbers, and decide not to take any calls from them. Calls from restricted lines (or any call lacking CID information) are usually not answered by people in this situation.

There are many ways for a caller to access the communication, telecommunication or public switched telephone network (PSTN), be it a regular telephone line, a business line (e.g. a Private Branch Exchange (PBX)), the various Foreign Exchange services, cellular line, and more recently Voice over Internet Protocol (VoIP). In all cases, the calling line has a permanently assigned identification. This is the information that is communicated via the Caller ID (CID) system. It is illegal to modify (also known as spoofing) this information when using the public telephony system.

Note that the above does not mean that every handset has only one identification. In many cases, particularly in business situations, the PBX or the PSTN system proceeds to actually select the outgoing line for the caller, thus his identity for CID purposes; although the prior art focuses on doing this for cost issues (toll vs. local calls), not answerability. As seen in Marchiano, U.S. Pat. No. 6,804,344, businesses equipped with Foreign Exchange line capability, may have the Local Exchange Carrier (LEC) system select a foreign exchange line that allows for a cheaper call to take place. In this case, the called party as a resulting effect of selecting a line for its cost effectiveness will see different CID information based on the foreign exchange line selected.

The foreign exchange service provides customers remote local calling capabilities on a point-to-point basis, i.e., from a particular originating location to a particular destination area. In effect, a customer purchases service from a carrier on a per-circuit basis for access via dedicated circuit connections. For example, a customer can purchase a foreign exchange line for Miami, Fla., (305-262-XXXX) and connect it to their private branch exchange (PBX) at their Nashua, N.H. office (603-595-XXXX). With appropriate PBX programming, the system can then use this circuit to call from one originating location (Nashua) to one destination area (Miami), without incurring in toll fees beyond those required to lease the line.

Out of desperation, some businesses have resorted to the use of questionable services, mainly called caller ID spoofing (CID spoofing). CID spoofing is the practice of creating and transmitting fraudulent CID information over portions of the PSTN. This would generate false information on the CID display of the called party equipment. Caller ID spoofing can make a call appear to have come from any phone number the caller wishes, even though the caller does not legally own or lease the number being displayed. This practice is highly questionable (at times illegal) since it is actually tampering a signal and sending false information through the PSTN without the rightful owner's consent. This can be viewed as the unauthorized forging of a digital signature through a clearly deceptive tactic. The Federal Debt Collection Act specifically addresses the issue of the use of deceptive tactics in collection services. In short, any approach that illegally alters the identification on the CID system would be potentially illegal, leaving the biggest and more serious companies without a viable alternative to address these need that the present invention covers.

SUMMARY OF THE INVENTION

This section is for the purpose of summarizing some aspects of the present invention and to briefly introduce some exemplary embodiments. Simplifications or omissions may be made to avoid obscuring the purpose of the section. Such simplifications or omissions are not intended to limit the scope of the present invention.

In one aspect, the present invention relates to a line selector apparatus for providing a selectable outgoing line for calls using portions of the public switched communication network having a variety of available external communication lines, the system comprising connecting means for the connection of a variety of available external communication lines to a communication lines, selection means for the selection of one of the available communication lines as the outgoing line, second connection means for the connection of the selected outgoing line to the calling party communication.

In another aspect, the present invention relates to an apparatus where the outgoing communication line is randomly selected by the system.

In another aspect, the present invention relates to an apparatus where the automated selection of the outgoing line is based on additional knowledge about the party to be called, basing the selection criteria on maximizing the likelihood of the call being answered by the intended call recipient.

In another aspect, the present invention relates to an apparatus where the local intelligent network can be interconnected with another similar network, share the called parties information, and the outgoing call line be selected and placed through the plurality of lines connected to that similar intelligent network.

In another aspect, the present invention relates to an apparatus where the outgoing lines are sub-leased lines temporarily used via previous sub-letting agreement;

The new and novel telephony system provides an apparatus that allows users of the system to select from a large number of fresh or continually renewed numbers (i.e. outgoing telephone lines that have never appeared in the CID equipment of the given called party), so that they can call the called parties through lines that could not be directly associated with the calling party.

This apparatus and system permits the user to select lines from area codes, local exchanges or prefixes where the system logic has determined that the called parties have family, acquaintances or prior familiarization. Using these familiar area codes and/or prefixes would improve the probability that called parties will "trust" the call, thus increasing the probability for the caller that a given call would be "picked-up" or answered. The system also maintains a line usage database and logic software through which it automatically audits usage to determine and/or recommend which lines have been and should be used for each specific called party, and also informs which lines should replaced with "fresh" or new ones.

A telephone number loses its strategic advantage once a relationship to the caller is established by the called party. The invention required is one that provides callers with the ability to "time-share" or fractionally own a number of an existing and/or temporarily leased phone lines from which to originate their calls, and to select which line to originate the call from in order to maximize the probability that the called party will answer. This we defined as a Familiarization Augmentation System and Technology (FAST) Dialer. Of course this does not preclude some larger consolidators from leasing a lot of phone lines, and sub-leasing them on a time share basis to smaller operators or callers.

Others have attempted to provide the ability to select a line in order to lower the toll cost of the call. However, this is not enough to implement the present art and address the stated need. For companies interested in improving the pick-up or answer rate of the called parties, the actual toll costs of the call is but a small part of the equation. What they require is not the cheapest possible call connection (which in the stated case of Marchiano may lead to repeating the outgoing line used), but the ability to choose a line to use in calling a specific customer at a specific time, and the logic to generate the optimal line selection to maximize the possibility that the given called party will answer the call.

This invention gives businesses the ability to "time-share" or "fractionally" own, as to allow legitimate ownership or use rights, a near infinite number of telephone lines, whether from a telephone carrier or a sub-lessor, without needing to outright lease them all, and then be able to select from amongst them as required in order to present a CID to the called party that will maximize the probability of the called party answering the call. As is common in the tele-marketing industry, such a system is integrated with automatic dialers and called party databases to manage the calls being generated through the system. Such systems and means include the capability of this system to be managed remotely through an Internet based Graphical User Interface (GUI) and/or an Application Service Provider (ASP). Also the present system is networked via common or dedicated telephone lines to a plurality of similar systems operating in other areas, or exchanges, so as to take advantage of the variety of telephone lines directly connected to these remote systems. The originating system shares the information and logic for the line selection being performed by the remote system.

The factors used in the selection of one line (and its CID) over another are important, and a critical part of the invention is the weighting of the factors important to their selection. For example, line selection may be affected by exchange, prefix, location, personal information about member(s) of the called party household, time of day, and/or any combination of these and many more. Feedback is also critical, by keeping a record of which lines have been used for any given receiving telephone number, when they were used, whether a man or woman responded to the call, etc., the system is capable of advising the system operator which lines should be replaced with new ones as to maintain a relatively "fresh" and effective inventory of outgoing lines.

In addition to sub-letting the line from a party such as a local telephone company (presumably out of the lines the company controls but is not using), there is the additional possibility of sub-leasing the line from private parties. In this fashion, one could see an agreement with an individual, through which the company acquires control of a phone line for a predetermined amount of time, and is appropriately remunerated for this. Imagine if you will, that your phone is sub-let to another party from 10-11 am weekdays, in exchange for $2.00 (or $10) per month and the cost of any calls. Many singles would not mind this (presumably they are at work).

Other features and advantages of the present invention will become apparent upon examining the following detailed description of an embodiment thereof, taken in conjunction with the attached drawings.

DESCRIPTION OF CERTAIN ILLUSTRATIVE EMBODIMENTS

There are many ways for a caller to access the communication, telecommunication and other parts of the public switched telephone network (PSTN) system when making a call. Some of these include the traditional single telephone line connected to a central office (be it a home or business line), the multiple-line multiplexed connection, traditionally routed trough a Private Branch Exchange (PBX), Foreign Exchange lines (be it a physical or virtual connection), the cellular line, and more recently the Voice over Internet Protocol (VoIP) connection. In all cases, the calling line has a permanently assigned identification, linked to its unique identification, the telephone number.

The telephone number is the minimal information that is communicated via the Caller ID (CID) system (sometimes other information linked to the account, e.g. name, business name, etc. may be communicated). The process of receiving a call on a phone equipped with CID is well understood to those skilled in the art. U.S. Pat. No. 4,582,956 to Doughty, the disclosure of which is incorporated herein by reference, explains clearly how originating call information is generated and transmitted across the telephonic network and received by the intended call receiver. As intended, the CID system allows the called party (called party) to ascertain the identity of the caller, and proceed to decide whether to answer or not. As explained above, in many situations, the called party learns the number (or numbers) used by certain parties that call them, and proceed to avoid answering calls from such parties.

Landline handsets, unlike cell phones, do not necessarily have only one system identification. In many cases, particularly in business situations, either the PBX system, or the PSTN system, proceeds to actually select the outgoing line for the caller among the lines connected to it. In the case of traditional foreign exchange lines, this is a permanent solution (typically requiring the local carrier to reconnect circuits at the central office). More recently, as explained in U.S. Pat. No. 6,804,344 to Marchiano et al, and in U.S. Pat. No. 5,767,894 to Kay et al (the disclosure of both is incorporated herein by reference), the concept of a virtual foreign exchange line has expanded so that multiple direct copper wire connections are not a necessity, and the idea of time-sharing these becomes feasible.

Figure 1:
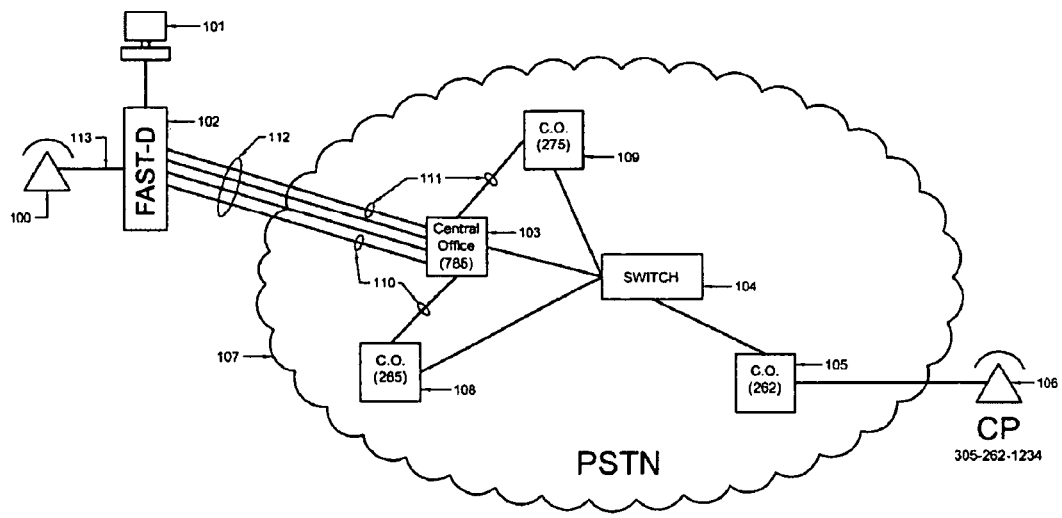
FIG. 1 is a schematic block diagram of a telephony system incorporation of the instant invention using traditional foreign exchange lines.

FIG. 1 is a schematic block diagram of a telephony system incorporation of the instant invention using traditional foreign exchange lines. Let's say the caller, with offices in Miami, Fla. would like to call his client in Coral Gables, Fla. The caller has a traditional land-line switched telephone 100, connected by line 113 through his FAST-Dialer system unit 102 to his central office 103. The caller's location is in area code 305 (Florida), local exchange 555 (Miami), with local number 0291. This provides a worldwide, PSTN unique identification, USA, 305-555-0291. The called party (called party) 106 is served by central office 105 in Coral Gables, Fla., also in area code 305, local exchange 262, and number 1234. This makes his worldwide station unique ID USA, 787-262-1234.

A call from the caller to the called party will be routed through the PSTN 107, which itself contains a series of switches 104. When the telephone rings at called party, the called party CID system will display the caller's information. Unfortunately in this case, the called party owes money to the caller, and upon seeing the 305-555-0291 information on the CID, opts not to answer the telephone. Blocking the ID would be counterproductive (most people in the called parties situation already ignore any call with blocked ID or no identifying called party information).

The caller is equipped with an FAST-Dialer system 102. In one embodiment, the FAST-Dialer line multiplexer is connected to a number of traditional foreign exchange lines 112 connected to the caller's office unit 102. These lines are themselves routed through the central office serving the caller 103, to their respective central offices 108, 109. Thus line 110 is an actual line routed from the Fort Lauderdale central office 108 through the Miami central office 103 to the FAST-Dialer multiplexing system at the caller's office. Similarly, a line 111 has been routed from the Hialeah central office 109, through the Miami central office 103 to the caller location.

The caller proceeds to use his FAST-Dialer system 102 by logging onto his computer 101, and querying which lines are available for his use at this time. In one embodiment, there are various ways to select a line, illustrated in FIG. 6. One of them, is to select randomly from the lines that have not been used before to call the called party. Such is the present case, where the caller proceeds to do that, electing a random line selection.

The FAST-Dialer system computer 101 has in its database the fact that the called party has never been called from the available line 110 in the Fort Lauderdale central office 108. This foreign exchange line is selected, and the line 110 connected to the caller's telephone line 113 and telephone 100. In this way, when the caller picks up the handset 100 to dial, there is no requirement to do anything special to dial the foreign exchange line 110. When the call is dialed, the caller's telephone 100 is now connected to a foreign exchange line 110 in a central office located in Fort Lauderdale, Fla. This line 110 is also in the 305 (FL) area code, with a central office prefix (265), and number 5555.

The caller then has his call made using line 305-265-5555 routed through the PSTN 107 into the Coral Gables central office 105 and the telephone of the called party. Of course, besides the cost of using the FAST-Dialer system, the caller will be responsible for the additional toll charges of the call coming from Fort Lauderdale to Coral Gables. All of this will be a good investment if and when the called party answers the phone. At that time, the caller, if it were a financial institution for example, can use the initial pause to explain to the called party the situation and offer options to remedy it, like a payment plan, rather than having their credit and contractual relation ruined.

Figure 2:
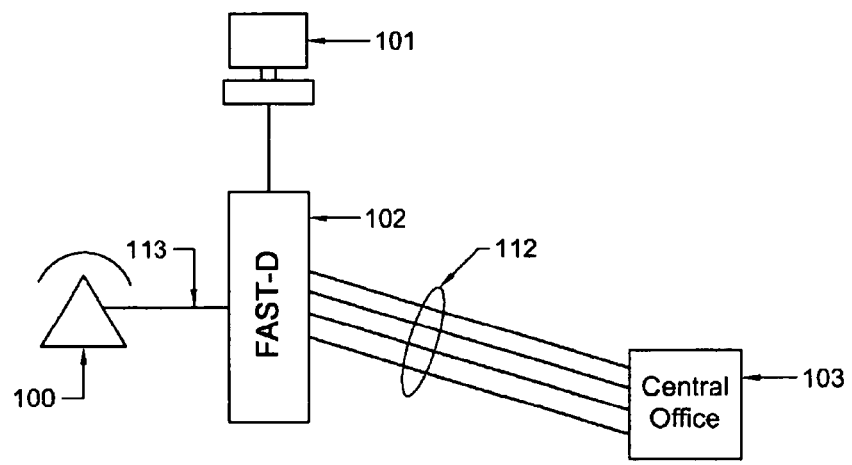
FIG. 2 is a schematic block diagram of an interface to traditional foreign exchange lines.

FIG. 2 illustrates details of the an illustrative embodiment between the central office and the caller. The FAST-Dialer system hardware 102 consist of a multiplexer capable of interfacing the single telephone line 113 that connects the telephone 100 with the multiple foreign exchange lines 112 coming through the central office 103. From the central office 103, these are further routed through the PSTN via conventional means well understood by those skilled in the art. An advantage of this "in-office" configuration is simplicity in calling. The caller selects the desired outgoing line via the application running on the office computer 101, this computer may be linked to a central FAST-Dialer application, or may also work as a standalone application.

In one embodiment, this local computer has knowledge of all the foreign exchange lines 112 connected to the FAST-Dialer system 102 at this location. The caller uses the application running on 101 to select from these lines. Upon selection, the computer 101 interfaces to the FAST-Dialer system 102, which then connects the appropriate foreign exchange line to the telephone line 101 connected to telephone 100. In this way, when the caller picks up the telephone 100 to dial, the dial tone he/she gets is the complete system can operate without any required computer interface to the LECs, beyond the traditional dialing interface.

Figure 3:
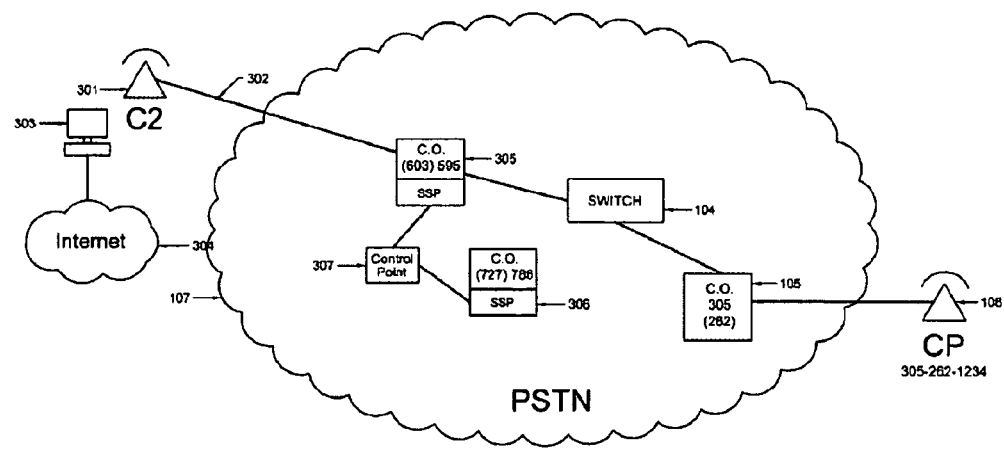
FIG. 3 is a schematic block diagram of a telephony system implementation using virtual foreign exchange lines.

Connecting traditional foreign exchange lines involves manual labor by the operator of the Local Exchange Carrier (LECs), and hence limits the flexibility of the numbers available to execute calls from. Since once a line is used, its "value" decreases, it would be advantageous to be able to dynamically switch to other lines. As seen in FIG. 3, this implementation is envisioned in one embodiment through the use of virtual foreign exchange lines. This type of foreign exchange line is described in Kay, U.S. Pat. No. 5,767,894 (incorporated herein by reference). In one embodiment, this type of caller has an FAST-Dialer system implemented within the PSTN, requiring no special hardware at their location to temporarily access a new outgoing line.

As seen in FIG. 3, caller C2's telephone 301 has a line 302 connected to a central office 603 (in area code 603 (NH), exchange 595 (Nashua), number 0710) that is equipped with the ability to enable a virtual foreign exchange line. When C2 usually dials a number, his permanently assigned telephone number (603-595-0710) is used. In this case, the called parties CID information displays the above number, and the called party decides not to answer. C2 then decides to use the FAST-Dialer system to call using a dedicated or temporarily leased line. The first step is to log onto the FAST-Dialer website (and associated server) via C2's computer 303 and its internet connection 304. Once C2 has accessed the FAST-Dialer system, the system proceeds to query caller C2, in order to provide the optimal line. C2 happens to know that a cousin of the called party lives in Palm Harbor, Fla. C2 enters this information, and the FAST-Dialer system displays the options to call from Palm Harbor.

In this case, the LEC in Palm Harbor has contracted with the FAST-Dialer administrators, and has made 727-786-5756 (the Florida area code (727), and a Lake Worth 306 exchange (786), number 5756) available. In addition, the FAST-Dialer system database indicates that the number has not been used previously in calling the called party. C2 selects this as the number for the outgoing call. The FAST-Dialer system then proceeds to inform the LEC that it would like access to the number (727-786-5756). The Control Point 307 interfaces to the Service switching points within the central offices (again, as explained in U.S. Pat. No. 5,767,894). Note again, that unlike the prior art, we are not basing the selection on the toll charge, but factors such as the temporal availability of the line, whether the line has been used (successfully or not) in contacting the called party previously, and other information that will maximize the chances of the call being answered.

Once the line is available to C2, the FAST-Dialer system confirms the line connection, and as is the case with virtual foreign exchange lines, C2 dials a predetermined access code (for example, '*95'), before dialing the called party at 305-262-1234. The access code informs the foreign exchange customer's station within his central office switch 305 to initiate an Advanced Intelligence Network (AIN) transaction. In one embodiment, the line remains temporarily leased to C2 until the call is finished, or C2 hangs up. In an alternative embodiment, the line would continue in C2 possession (i.e. unavailable to other customers of the FAST-Dialer system) until actively released through the FAST-Dialer system interface through C2's connection to the FAST-Dialer GUI.

Figure 4:
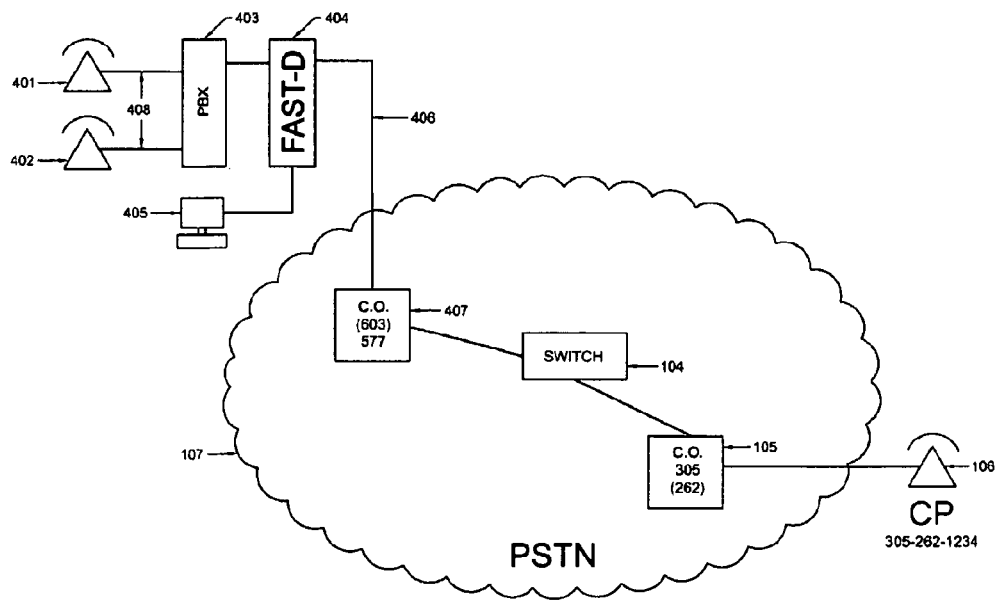
FIG. 4 is a schematic block diagram of a telephony system implementation through a Private Branch exchange.

Note that we are not limiting the FAST-Dialer system to operate only from single telephone facilities. As seen in FIG. 4, the system may be implemented using private branch exchanges and automated dialers, typical of a tele-marketers implementation. That is the case of caller C3, where the location is a company with multiple telephone lines 401, 402. This is common for companies that utilize Private Branch Exchange (PBX) setups 403, where multiple internal lines 408 are connected to a lesser number of external lines 406. In this case, the central office 407 is in NH (area code 603), in Nashua (exchange 577), with the number 8300. In addition, tele-marketing and other mass dialing firms further enhance their systems by coupling the telephone system 403 with automated dialers as well as other computer controlled utilities 405 to facilitate the efficient in/out flow of calls.

In one embodiment, cases such as these are the integration of the FAST-Dialer system 404 to the auto-dialers and other telemarketing software may be accomplished within a single computer 403 (or computer network). The operation of such a system is similar to that of the system for the caller in FIG. 1, in that the calling system is interfacing to the telephony network through the traditional PSTN 107. As is the case with the call from the user in FIG. 1, the person operating the telephone 401, would like to speak with the called party in Coral Gables 106. The biggest difference between the caller in FIG. 4, and that in FIG. 1 is in the integration of the software programs performing the selection of the line to be used, for it would have to deal with many callers 401, 402. The application running in the FAST-Dialer computer has access to a database of available numbers. In one embodiment these are the foreign exchange lines 406 available to the customer site (whether direct or virtual foreign exchange lines as explained before).

Figure 5:
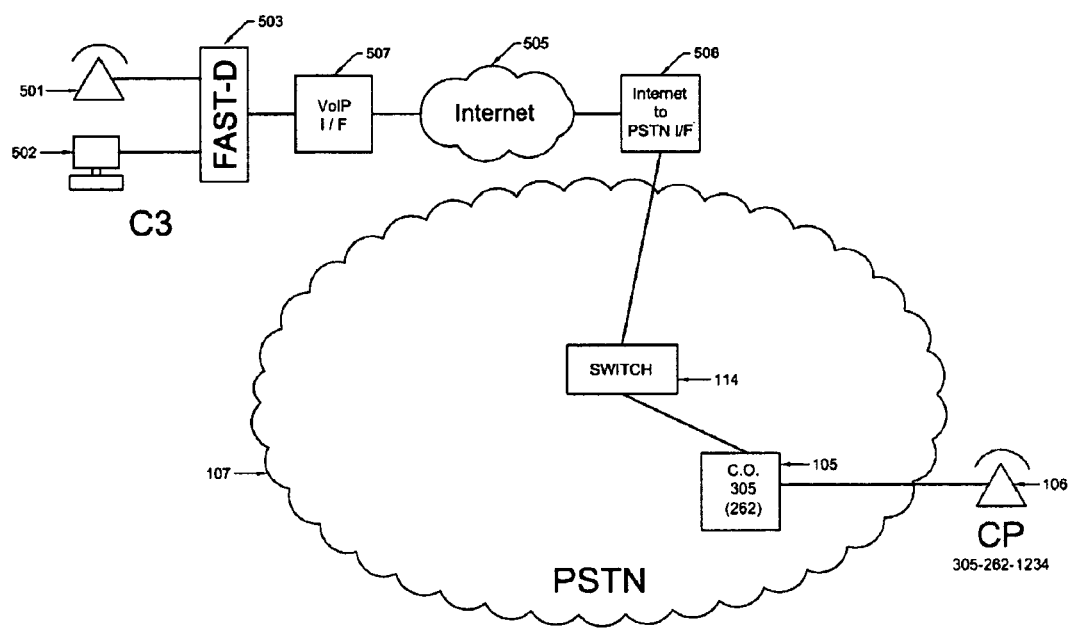
FIG. 5 is a schematic block diagram of a telephony system implementation through a Voice over IP (VoIP) interface.

Note that the system is not limited to exclusively working within the PSTN. As seen in FIG. 5, users like (C3) who have opted out of the switched network, and instead use Voice over IP (VoIP) telephony, may also use this. Such systems are described in Jones, U.S. Pat. No. 6,141,341 (incorporated herein by reference). FIG. 5 illustrates details of an illustrative example embodiment for VoIP applications. Depending on model, VoIP interface boxes 504 (such as those provided by Vonage or VoicePulse) are capable of hosting multiple telephone numbers. These are capable of working simultaneously and/or singly. In this case, the FAST-Dialer system 503 is a simpler interface to the VoIP box 504. As before, when the user C3 selects from the lines available, the computer 502 interfaces to the VoIP I/F 504, enabling the line selected in it to be connected to the telephone 501.

C3's VoIP number is in the state of Washington (Area code 253), in Tacoma (484), number 9824. The called party in Broward 106 is also a customer, who has a couple of invoices well past the due date. When C3 calls, her telephone 501 gets routed through a VoIP I/F unit 504 which provides her with a dial tone and interprets her calling instructions (787.262.1234) via her VoIP provider (e.g. VoicePulse, Vonage and others) and the Internet 505. At an appropriate time, the VoIP packets are routed to the closest internet to telephony I/F unit 506, which then "enters" the telephony network through traditional switch units 114 that routes the call to the Broward central office 105 and the called party 106. Unfortunately, as with the user in FIG. 1, upon seeing the number of C3 on the CID unit, the called party decides to not answer the call, letting it go to the answering machine.

Suspecting that the called party is avoiding her, C3 logs onto the FAST-Dialer system through her computer 502, and through the FAST-Dialer system interface selects from the available lines to call the called party with (FIG. 5). As is the case for C2, C3 also knows that the called party has another cousin in Lake Worth, Fla., and also opts for a number from the area. The FAST-Dialer system then proceeds to inform user C3 that another caller (without identifying the caller of FIG. 1) has recently (identifying the date) used the 561-966-XXXX exchange to call the called party, and that they answered the call, which lasted 26 minutes.

Based on this information, C3 opts not to use this Florida line (which is still being made available to the FAST-Dialer system by the LEC), instead opting for a Miami, Fla. (exchange 305-785-XXXX) number, where C3 knows the called party has a girlfriend. The FAST-Dialer system interface 503 enables C3 telephone 501 to temporarily connect as 305-785-0291. Again, as with C1, C3 will be responsible for the additional toll charges (plus any FAST-Dialer fees), but the probability of her call to the called party being answered just went up significantly.

A critical part of the invention is the system used to select the line to call the called party, with the goal of maximizing the probability of them answering the call either by increasing the familiarity to a number or diminishing its association with the calling party. The simplest implementation of the application consists of randomly selecting a number from those available. Based on stochastic principles, this would provide a basic probability of success. The second approach consists of showing the complete list of available foreign exchange lines to the user for his selection via a GUI.

In addition to sub-letting the line from a party such as a local telephone company (presumably out of the lines the company controls but is not using), there is the additional possibility of sub-leasing the line from private parties. In this fashion, one could see an agreement with an individual, through which the company acquires control of a phone line for a predetermined amount of time, and is appropriately remunerated for this. Imagine that your phone is sub-let to another party from 10-11 am weekdays, in exchange for $2.00 (or $10) per month and the cost of any calls. Many singles would not mind this (presumably they are at work). In alternate embodiments of the above, the selection of a sub-lessee may be done based on first and/or last name (Rivera and/or Smith are a very common surnames in some countries, perhaps the recipient may answer thinking a cousin is calling).

Figure 6:
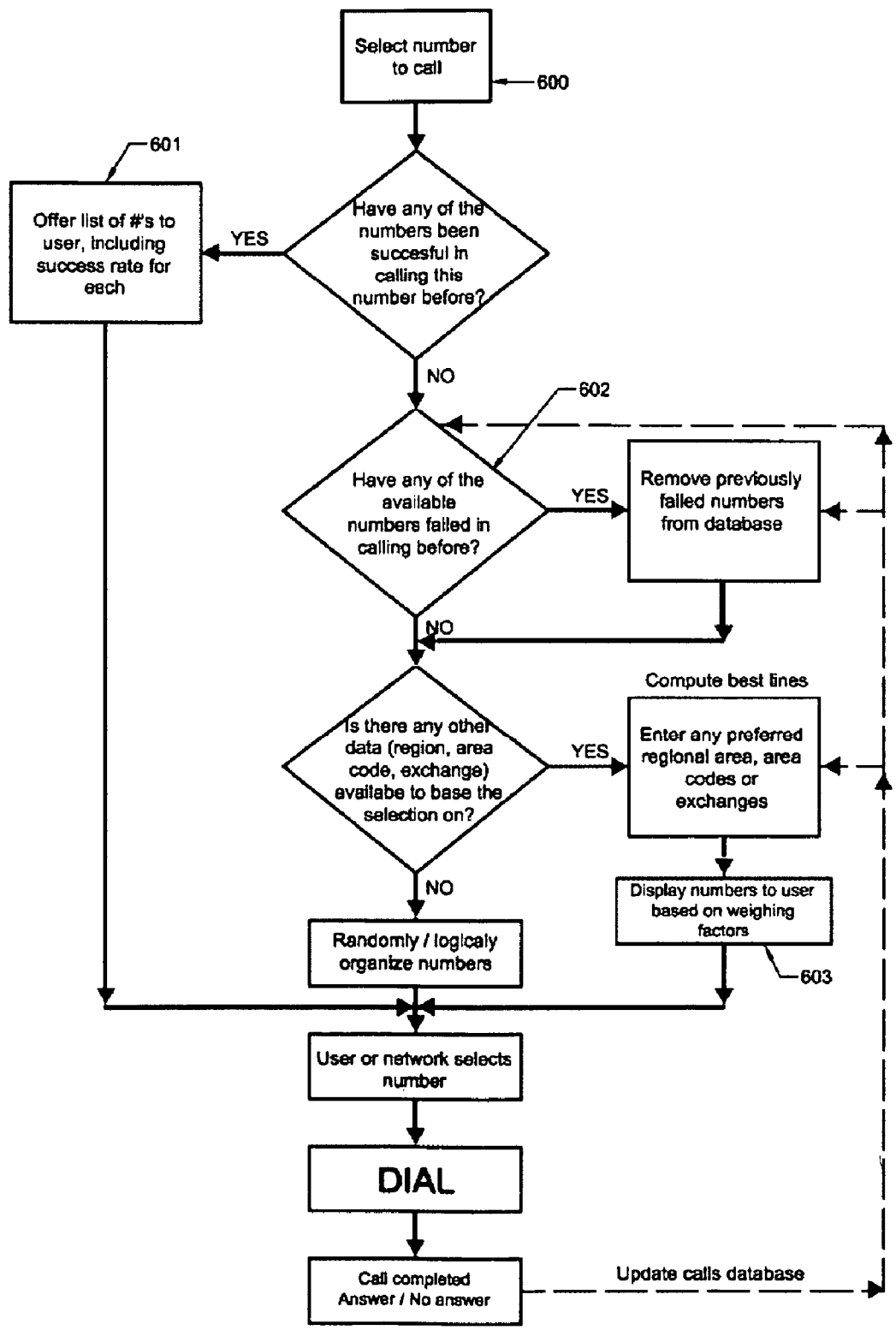
FIG. 6 illustrates a Flowchart diagram of the system operation when optimizing the line to be used in a call.

This would also vary the probability (depending on the knowledge about the called party possessed by the caller). In one embodiment, the processing of available numbers through a series of weighted factors is used to select the number to use. FIG. 6 illustrates the logic of one exemplary illustrative embodiment. Effective execution of this strategy would require maintaining a relational database (e.g. Microsoft Acces) that would relate the name of a party with the various telephone numbers registered to them (e.g. home, fax, work, mobile), and then keep track of success/failure events related to the calling of these parties, time at which the calls were executed, whether a female or male answered, etc.

First the outgoing line number to use for the call to the called party is selected. In one embodiment this is done via its own set of weighs regarding to the factors above, e.g. time of day, expected called party location, etc.). Once the number is selected, 600, the database of available outgoing lines is searched to see if any of them have been successful previously in reaching the called party. In one embodiment, these are then automatically selected in order of probability of success, and dialed (in the case of automated telemarketing software). Hence a number that has been successful multiple times is used first, etc.).

In case no other number has been successful, we next look to avoid repeating failure. If any of the available numbers has already been unsuccessful in the past 602, the available dialing lines that have failed before are eliminated from the list for a particular called party.

Finally, the system checks the database for any preferred regional, area code, local exchange informational preferences. These may either be entered by the user, purchased from third parties, or simply "divined" by any software capable of pattern recognition based on both the user information and the previous numbers eliminated. Based on the above factors, a list is generated in decreasing order of answering probability. That is, the number with the expected highest probability is used as the first outgoing line for the autodialer to select. If none of the above data is enough to generate a higher probability of answerability, then one of the available numbers is selected randomly.

In an alternative embodiment, the list of numbers is presented to the caller in the order in which they would be considered by the automated logic, but the caller gets to supersede the picking of the actual outgoing line if there is anything pattern he/she feels will increase the chances of a successful call. Alternatively, a randomly picked number from the available list is presented to the caller.

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

What is claimed is:

1. A communication line selector apparatus for providing a selectable outgoing line for calls using portions of the public switched communication network having a variety of available external communication lines, the apparatus comprising;
   connecting means for the connection of a variety of available external communication lines to a communication line;
   selection means for the selection of one of the available communication lines as the outgoing line;
   second connection means for the connection of the selected outgoing line to the calling party communication; and
   the automated selection of the outgoing line is based on additional knowledge about the party to be called, basing the selection criteria on maximizing the likelihood of the call being answered by the intended call recipient.

2. The apparatus of claim 1, wherein;
   the outgoing lines are sub-leased lines temporarily used via previous sub-letting agreement.

* * * * *